Figure 1:
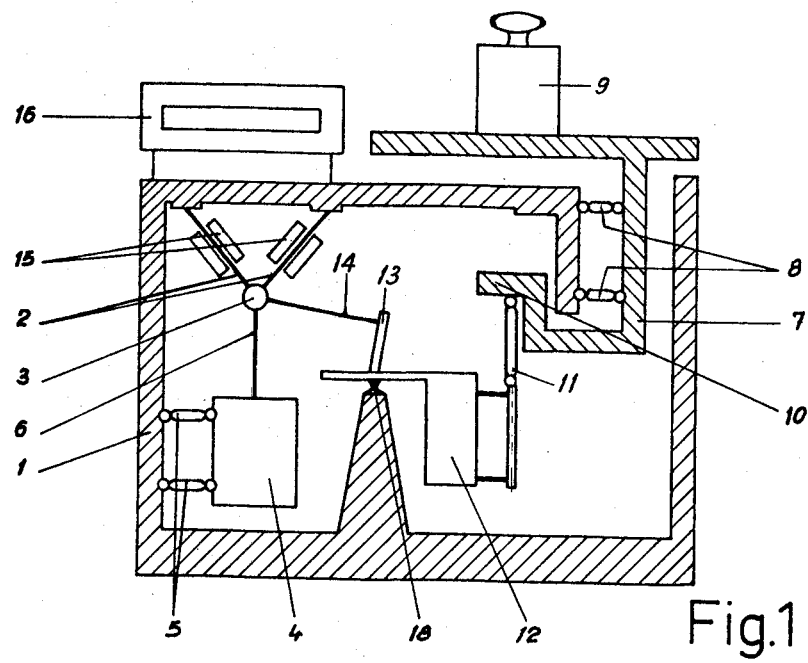

United States Patent [19]
Saner

[11] 3,724,572
[45] Apr. 3, 1973

[54] ELECTRONIC MEASURING APPARATUS FOR MEASURING MASSES AND FORCES

[75] Inventor: Kaspar Saner, Dubendorf, Switzerland

[73] Assignee: Wirth, Gallo & Co., Zurich, Switzerland

[22] Filed: May 9, 1972

[21] Appl. No.: 251,651

[30] Foreign Application Priority Data

Aug. 2, 1971  Switzerland..................11358/71

[52] U.S. Cl..............................................177/210
[51] Int. Cl.................................................G01g 3/14
[58] Field of Search..................177/1, 210, 184, 251; 73/141 A

[56] References Cited

UNITED STATES PATENTS

| | | | |
|---|---|---|---|
| 3,423,999 | 1/1969 | Wirth et al. | 177/210 UX |
| 3,612,198 | 10/1971 | Galb | 177/210 |
| 3,621,713 | 11/1971 | Wirth et al. | 177/210 X |

Primary Examiner—George H. Miller, Jr.
Attorney—Stevens, Davis, Miller & Mosher

[57] ABSTRACT

Two pretensioned vibrating strings are respectively stressed and stress-relieved by a force to be measured, said force being applied through a compensating lever incorporating an arm whose effective length varies as a function of force applied to maintain linearity.

6 Claims, 2 Drawing Figures

ELECTRONIC MEASURING APPARATUS FOR MEASURING MASSES AND FORCES

This invention relates to an electronic measuring apparatus, for measuring masses and forces, with an evaluating and indicating device, in which the value to be measured acts on the tension of two pretensioned oscillating strings, which are excited by electronic means so that they oscillate laterally. The change in the frequencies of the strings caused by the added mass or force is used for calculating and indicating this value in the evaluating and indicating device. The two strings and two motion-transmitting members are attached to a central body in a star-like configuration, these motion-transmitting members serving to transmit a tensioning force and also a force which is a function of the value to be measured. Measuring apparatuses of this kind are known, for example, from the disclosures of Swiss Patent No. 492,961 or U.S. Pat. No. 3,423,999.

The value which is to be measured may be constituted by the weight of an object. In this case the two strings are pretensioned, preferably uniformly, by the mass of a pretensioning member, these strings being respectively stressed and stress-relieved in a specific ratio by the weight of the mass which is to be measured. The changed frequencies of the strings are an indication of the ratio of the two masses and of the object. If the value which is to be measured is in the form of a force, then it so acts on the strings that one of these strings is additionally stressed and the other is relieved of stress. The frequencies of the strings are an indication of the ratio of the force which is to be measured to the mass of the member for pretensioning the strings.

Evaluating devices are known, for example, from the disclosure of Swiss Patent 477,636, which gives the results by way of the ratio of the two string frequencies. In the case of these evaluating devices it is known that if the force, which is a function of the value which is to be measured, is transmitted to the strings subject to an increase or decrease in a constant ratio, then the characteristic of the measuring apparatus will, inter alia, be subject to an error of the third order. In other words the ratio of the value indicated to the magnitude of the value which is to be measured is not strictly constant over the whole measuring range.

The invention has the object of transmitting the force, which is a function of the value to be measured, to the strings in such manner that the above-mentioned error is compensated for.

According to the invention an electronic apparatus for measuring weights or forces comprises two pretensioned electronically excited oscillating strings each attached at one end to a movable central body, two motion transmitting members also attached at one end to the central body, the strings and motion transmitting members being so arranged that they radiate from the central body in a star-like configuration, the motion transmitting members serving respectively to transmit to the central body a pretensioning force and a force which is a function of the mass or force to be measured, and a compensating lever incorporating an arm whose effective length varies as a function of the mass or force to be measured, the force which is a function of the mass or force to be measured being transmitted to the respective motion transmitting member through the compensating lever.

An exemplary embodiment of the subject matter of this invention is illustrated in the accompanying drawing.

Figure 2:
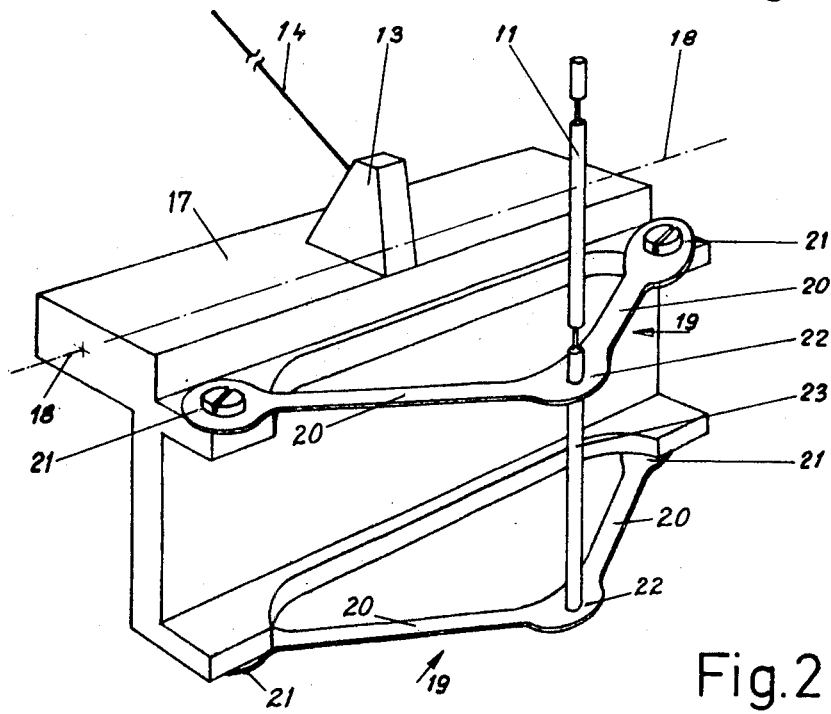

In this drawing:

FIG. 1 is a vertical cross-sectional view taken through the measuring apparatus as a whole, and FIG. 2 is a diagrammatic view of the compensating lever, shown on a larger scale.

The embodiment of the invention illustrated in FIG. 1 is in the form of a table balance. This balance incorporates a frame 1, in which two strings 2 are arranged. One end of each of the strings 2 is attached to a central body 3. In the frame 1 a pretensioning member, in the form of a mass 4, is guided, in a vertical plane, by means of two parallel guide bars 5. This pretensioning mass 4 is suspended from the body 3 by wire 6. The mass of this pretensioning member 4 determines the extent to which the strings 2 are pretensioned, this pretensioning being, in the example being described, a constant one. On the frame 1 a balance pan 7 is guided, in a vertical plane, by means of parallel guide bars 8, the balance pan 7 supporting the mass 9 whose weight is to be determined. The lower end 10 of the balance pan 7 acts, by way of an articulated intermediate member 11, on a compensating lever 12, which is described in greater detail below with reference to FIG. 2. The arm 13 of the compensating lever 12 is connected to the body 3 through the intermediary of a string or wire 14. Thus, the weight of the mass 9, which is to be weighed, acts on the strings 2, reduced in an appropriate ratio. One of the strings is thus subjected to additional tension, while the other is subjected to reduced tension. Further, there are arranged, on the frame 1, two combined exciter and pick-up heads 15, these heads 15 being connected to an evaluating and indicating device 16. The frequencies of the strings 2 are compared with one another, in a known manner, in this evaluating and indicating device 16. The value of the mass 9 is obtained in a known manner from a comparison of these frequencies, the result being displayed digitally.

The compensating lever 12 is diagrammatically illustrated in FIG. 2. This lever 12 consists of a solid body 17, to which arm 13 is attached. The body 17 is pivotably mounted, about a fulcrum 18, in the frame 1. Two leaf springs 19 are arranged on the body 17. Each of the leaf springs 19 consists of two shanks, which together define an obtuse angle and whose ends are widened at 21. The ends 21 of the leaf springs 19 are clamped in position on the body 17. The central part 22 of each leaf spring 19 is somewhat wider than the shanks 20. A rigid rod 23 is clamped in position on the portions 22, and thus interconnects the two leaf springs 19. The rod 23 is substantially vertically positioned, that is to say, it lies parallel to the direction of the load applied to the leaf springs 19.

As has already been mentioned, in measuring apparatuses of this type the ratio between the result, indicated by the evaluating and display device 16, and the force acting on the body 3 by way of wire 14, is not strictly linear. Inter alia this relationship is subject to a small error of the third order, as explained above. Thus, when a mass is transmitted by way of levers of a constant length — that is to say levers which transmit motion subject to a constant step-up or step-down ratio — then the characteristic of the measuring apparatus is also subject to a small error of the third order.

For the purpose of eliminating this drawback, the above-described compensating lever 21 transmits the weight of the mass 9, which is to be weighed, subject to a step-up or step-down ratio, which is a function of the load. THe leaf springs 19 are so dimensioned that the effective lever arm varies by an amount which is proportional to the square of the load. The result of this is that — except for members of higher order, which lie below the threshold of sensitivity of the measuring apparatus — the unfavorable non-linearity of the third order of the measuring apparatus is compensated over the whole measuring range.

In practice the measuring apparatus will, conveniently, be so constructed that the leaf springs 19 of the compensating lever 21 assume a horizontal position for a load which corresponds to approximately half of the measuring range of the measuring apparatus. Under these circumstances the effective length of the lever arm of the compensating lever 12 varies as the square of the difference between this load (subject to which the leaf springs 19 are horizontally positioned) and the actually existing load. The shanks 20 are widely separated from each other; for example they may define an included angle greater than 120°. In this way it is ensured that the extent to which they are mechanically loaded is appreciably smaller, for a given extent of movement of the rod 23 and subject to a constant load, than would be the case with simple leaf springs.

What we claim is:

1. An electronic apparatus for measuring weights or forces comprising two pretensioned electronically excited oscillating strings each attached at one end to a movable central body, two motion transmitting members also attached at one end to the central body, the strings and motion transmitting members being so arranged that they radiate from the central body in a star-like configuration, the motion transmitting members serving respectively to transmit to the central body a pretensioning force and a force which is a function of the mass or force to be measured, and a compensating lever incorporating an arm whose effective length varies as a function of the weight or force to be measured, the force which is a function of the mass or force to be measured being transmitted to the respective motion transmitting member through the compensating lever.

2. An apparatus according to claim 1 in which the compensating lever is so contrived that the effective length of the arm varies as the square of the force acting on the arm.

3. An apparatus according to claim 1 in which the compensating lever is so contrived that the effective length of the arm varies as the square of the force acting on the arm.

4. An electronic apparatus according to claim 1 comprising electronic indicating means for indicating the magnitude of the force to be measured.

5. an apparatus according to claim 1 in which the compensating lever comprises a rigid pivotally mounted body, and two V-shaped lead springs clamped to the body in mutually parallel planes, the leaf springs being connected at their central regions by a rigid rod set parallel to the direction of the force acting on the leaf springs.

6. An apparatus according to claim 5 in which each leaf spring comprises two shanks which together define an included angle of at least 120°.

* * * * *